US012601601B2

(12) United States Patent　(10) Patent No.: US 12,601,601 B2
Hori　(45) Date of Patent: Apr. 14, 2026

(54) VEHICLE NAVIGATION APPARATUS AND VEHICLE NAVIGATION SYSTEM

(71) Applicant: SUBARU CORPORATION, Tokyo (JP)

(72) Inventor: Yuina Hori, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 301 days.

(21) Appl. No.: 18/360,120

(22) Filed: Jul. 27, 2023

(65) Prior Publication Data

US 2024/0053155 A1　Feb. 15, 2024

(30) Foreign Application Priority Data

Aug. 13, 2022　(JP) ................................. 2022-129134

(51) Int. Cl.
*G01C 21/34*　(2006.01)
*G01C 21/36*　(2006.01)
(52) U.S. Cl.
CPC ..... *G01C 21/3415* (2013.01); *G01C 21/3484* (2013.01); *G01C 21/3617* (2013.01); *G01C 21/362* (2013.01); *G01C 21/3667* (2013.01)
(58) Field of Classification Search
CPC ............ G01C 21/3415; G01C 21/3484; G01C 21/3617; G01C 21/362; G01C 21/3667
See application file for complete search history.

(56) References Cited

U.S. PATENT DOCUMENTS

| | | | |
|---|---|---|---|
| 2009/0125229 A1* | 5/2009 | Peri .................... | G01C 21/3415 |
| | | | 701/533 |
| 2012/0179363 A1* | 7/2012 | Pierfelice ........... | G01C 21/3461 |
| | | | 701/423 |
| 2013/0103313 A1* | 4/2013 | Moore ............... | G01C 21/3664 |
| | | | 701/533 |
| 2014/0058672 A1* | 2/2014 | Wansley .......... | G08G 1/096827 |
| | | | 701/540 |
| 2015/0073631 A1* | 3/2015 | Lim ................. | G08G 1/096838 |
| | | | 701/22 |

(Continued)

FOREIGN PATENT DOCUMENTS

JP　2020-112479 A　7/2020

*Primary Examiner* — Anne Marie Antonucci
*Assistant Examiner* — Patrick Daniel Mohl
(74) *Attorney, Agent, or Firm* — Rimon P.C.

(57) ABSTRACT

A vehicle navigation apparatus includes an apparatus-side map storage, a driver characteristic information storage, a communicator, a route searching unit, and a coincidence determination unit. The communicator transmits driving operation characteristic information of a driver to a mobile terminal, and receives, from the mobile terminal, recommended route information retrieved based on the driving operation characteristic information of the driver. The route searching unit executes searching for route information, based on apparatus-side map information. The coincidence determination unit determines a coincidence between the recommended route information retrieved based on the driving operation characteristic information of the driver and the route information based on the apparatus-side map information. The route searching unit executes re-searching for route information, when the coincidence determination unit determines that the coincidence is less than a predetermined coincidence.

20 Claims, 9 Drawing Sheets

(56) References Cited

U.S. PATENT DOCUMENTS

| | | | |
|---|---|---|---|
| 2017/0045368 A1* | 2/2017 | Kim | G01C 21/362 |
| 2017/0328725 A1* | 11/2017 | Schlesinger | G01C 21/3438 |
| 2019/0113353 A1* | 4/2019 | Shimizu | B60W 50/082 |
| 2021/0215496 A1* | 7/2021 | Sese | G01C 21/3697 |
| 2024/0369368 A1* | 11/2024 | Berney-Dale | G01R 31/36 |

* cited by examiner

| PERSONAL INFORMATION | | | DRIVING OPERATION INFORMATION | | |
|---|---|---|---|---|---|
| SEX | AGE | DRIVING BEHAVIOR | ACCELE-RATOR OPERA-TION | BRAKE OPERA-TION | STEERING OPERATION |

START

TRANSMIT DRIVING OPERATION
CHARACTERISTIC INFORMATION          S110

RECEIVE RECOMMENDED
ROUTE INFORMATION          S120

IS
COINCIDENCE LESS
THAN PREDETERMINED
VALUE?          S130          NO

YES          S310

ACQUIRE INFORMATION ON
PARAMETER DESIGNATION TENDENCY

S320

ROUTE INFORMATION
RE-SEARCHING PROCESS

END

VEHICLE NAVIGATION APPARATUS AND VEHICLE NAVIGATION SYSTEM

CROSS-REFERENCE TO RELATED APPLICATIONS

The present application claims priority from Japanese Patent Application No. 2022-129134 filed on Aug. 13, 2022, the entire contents of which are hereby incorporated by reference.

BACKGROUND

The disclosure relates to a vehicle navigation apparatus and a vehicle navigation system.

Many recent vehicles are mounted with a vehicle navigation apparatus that, when a destination is set by a user at a departure point, searches for a route from the departure point to the destination, and performs route guidance by outputting an image, such as map display, and a voice.

The vehicle navigation apparatus presents multiple recommended routes and, when the user selects one recommended route out of the recommended routes, executes route guidance corresponding to the selected recommended route.

Therefore, it has still been difficult for the vehicle navigation apparatus described above to, for example, perform searching for a recommended route in consideration of a driver characteristic.

In view of the issue described above, disclosed is a route searching setting information generation apparatus that includes a reception unit, a searching unit, an identification unit, a setting unit, a control unit, a providing unit. The reception unit receives desired route information indicating a desired route from a departure point to a destination along which a user is to move. The searching unit searches for a route from the departure point to the destination and, when one or more waypoints are set, searches for the route in consideration of also the waypoint. The identification unit identifies a non-coincidence section between the desired route identified by the desired route information and a route searching result obtained by the searching unit. The setting unit sets a waypoint for the non-coincidence section on the desired route. The control unit controls the identification unit, the setting unit, and the searching unit to repeat a series of processes of identifying the non-coincidence section, setting the waypoint in the non-coincidence section on the desired route, and performing route re-searching in consideration of also the set waypoint, until the desired route and the route searching result coincide. When the desired route and the route searching result coincide, the providing unit generates and provides route searching setting information including pieces of information indicating the departure point, the destination, and the one or more waypoints set by the setting unit. For example, reference is made to Japanese Unexamined Patent Application Publication (JP-A) No. 2020-112479.

SUMMARY

An aspect of the disclosure provides a vehicle navigation apparatus to be applied to a vehicle. The vehicle navigation apparatus includes an apparatus-side map storage, a driver characteristic information storage, a communicator, a route searching unit, and a coincidence determination unit. The apparatus-side map storage is configured to store apparatus-side map information including route information. The driver characteristic information storage is configured to store driving operation characteristic information of a driver who drives the vehicle. The communicator is configured to transmit the driving operation characteristic information of the driver to a mobile terminal, and receive, from the mobile terminal, recommended route information retrieved based on the driving operation characteristic information of the driver. The route searching unit is configured to execute searching for route information, based on the apparatus-side map information. The coincidence determination unit is configured to determine a coincidence between the recommended route information retrieved based on the driving operation characteristic information of the driver and the route information based on the apparatus-side map information. The route searching unit is configured to, when the coincidence determination unit determines that the coincidence is less than a predetermined coincidence, execute re-searching for route information.

An aspect of the disclosure provides a vehicle navigation system including a vehicle navigation apparatus, a mobile terminal, and a server. The vehicle navigation apparatus is to be applied to a vehicle. The vehicle navigation apparatus includes an apparatus-side map storage, a driver characteristic information storage, a communicator, a route searching unit, and a coincidence determination unit. The apparatus-side map storage is configured to store apparatus-side map information including route information. The driver characteristic information storage is configured to store driving operation characteristic information of a driver who drives the vehicle. The communicator is configured to transmit the driving operation characteristic information of the driver to the mobile terminal, and receive, from the mobile terminal, recommended route information retrieved based on the driving operation characteristic information of the driver. The route searching unit is configured to execute searching for route information, based on the apparatus-side map information. The coincidence determination unit is configured to determine a coincidence between the recommended route information retrieved based on the driving operation characteristic information of the driver and the route information based on the apparatus-side map information. The route searching unit is configured to execute re-searching for route information, when the coincidence determination unit determines that the coincidence is less than a predetermined coincidence. The mobile terminal includes a receiver and a transmitter. The receiver is configured to receive the driving operation characteristic information of the driver from the vehicle navigation apparatus. The transmitter is configured to transmit the recommended route information generated by the server to the vehicle navigation apparatus. The server includes a server-side map storage and a recommended route information generation unit. The server-side map storage is configured to store server-side map information including route information. The recommended route information generation unit is configured to generate the recommended route information using the server-side map information, based on information including the driving operation characteristic information of the driver from the vehicle navigation apparatus.

An aspect of the disclosure provides a vehicle navigation apparatus to be applied to a vehicle. The vehicle navigation apparatus includes an apparatus-side map storage, a driver characteristic information storage, a communicator, and circuitry. The apparatus-side map storage is configured to store apparatus-side map information including route information. The driver characteristic information storage is configured to store driving operation characteristic information of a driver who drives the vehicle. The communicator is configured to transmit the driving operation characteristic information of the driver to a mobile terminal, and receive, from the mobile terminal, recommended route information retrieved based on the driving operation characteristic information of the driver. The circuitry is configured to: execute searching for route information, based on the apparatus-side map information; and determine a coincidence between the recommended route information retrieved based on the driving operation characteristic information of the driver and the route information based on the apparatus-side map information. The circuitry is configured to, when the circuitry determines that the coincidence is less than a predetermined coincidence, execute re-searching for route information.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
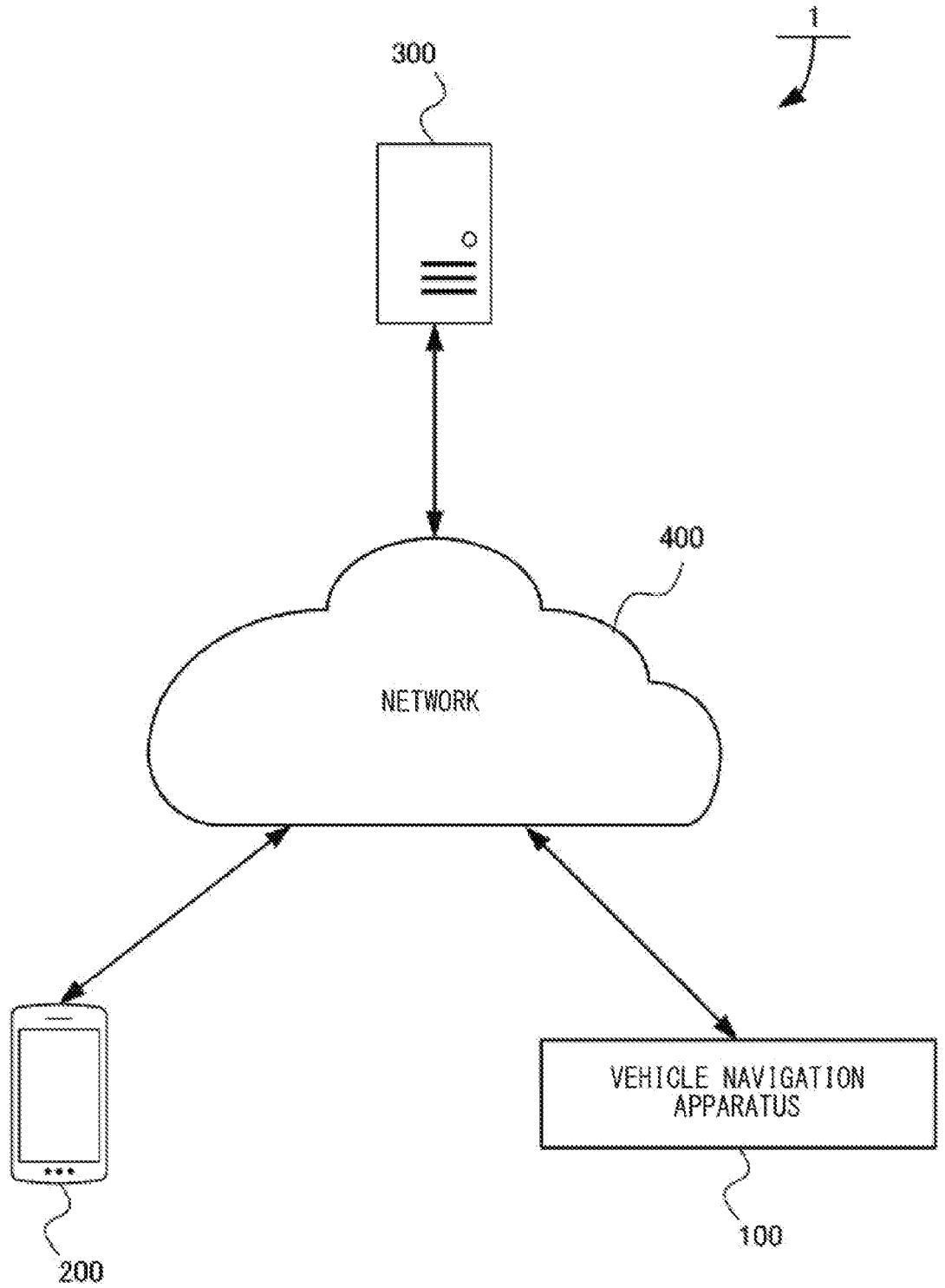
FIG. 1 is a diagram illustrating a configuration of a vehicle navigation system according to one example embodiment of the disclosure.

In a technique disclosed in JP-A No. 2020-112479, a unit is provided that receives desired route information indicating a desired route from a departure point to a destination along which a user is to move. When the departure point or the destination varies, the user has to present the desired route each time, which results in complicated operations.

In addition, according to JP-A No. 2020-112479, the desired route is a route designated by the user tracing a road on a map displayed on a device such as a mobile terminal with, for example, a mouse cursor, a finger, or an electronic pen. Even if the desired route indicates a driver characteristic, work for designation by the user is complicated, and due to the complicated work, it is unclear whether the designation is accurately based on the driver characteristic.

It is desirable to provide a vehicle navigation apparatus and a vehicle navigation system that make it possible to present a recommended route in consideration of a driver characteristic, without giving a user too much trouble.

In the following, some example embodiments of the disclosure are described in detail with reference to FIGS. 1 to 11. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Note that, in the following, vehicle navigation systems are described as examples, and description is given of vehicle navigation apparatuses.

First Example Embodiment

A vehicle navigation system 1 according to a first example embodiment is described with reference to FIGS. 1 to 7.

[Configuration of Vehicle Navigation System 1]

As illustrated in FIG. 1, the vehicle navigation system 1 according to the example embodiment may include a vehicle navigation apparatus 100, a mobile terminal 200, a server 300, and a network 400.

The vehicle navigation apparatus 100 may be mounted on a vehicle. The vehicle navigation apparatus 100 may search for a route from a departure point to a destination based on map information including route information stored in advance, and display a result of the searching on a display.

In the example embodiment, the vehicle navigation apparatus 100 may hold driving operation characteristic information of a driver who drives the vehicle, transmit the information to the mobile terminal 200, and receive recommended route information generated by the server 300 based on the transmitted driving operation characteristic information of the driver. The vehicle navigation apparatus 100 may determine a coincidence between the recommended route information and route information retrieved based on the map information including the route information stored in advance. When a determination is made that the coincidence is less than a predetermined coincidence, the vehicle navigation apparatus 100 may execute re-searching for route information.

The mobile terminal 200 may be, for example, a tablet PC or a smartphone carried by a user or an occupant of the vehicle.

The mobile terminal 200 may be provided with dedicated application software, and the application software may operate in cooperation with the vehicle navigation apparatus 100 and the server 300.

In one example, the application software may transmit driving operation characteristic information of the driver received from the vehicle navigation apparatus 100 to the server 300, and transmit recommended route information generated based on the driving operation characteristic information of the driver by the server 300 to the vehicle navigation apparatus 100.

The mobile terminal 200 and the vehicle navigation apparatus 100 may be coupled to each other via the network 400.

The server 300 may be coupled to the mobile terminal 200 via the network 400. The server 300 may generate recommended route information based on driving operation characteristic information of the driver received via the application software, using stored server-side map information.

[Configuration of Vehicle Navigation Apparatus 100]

Figure 2:
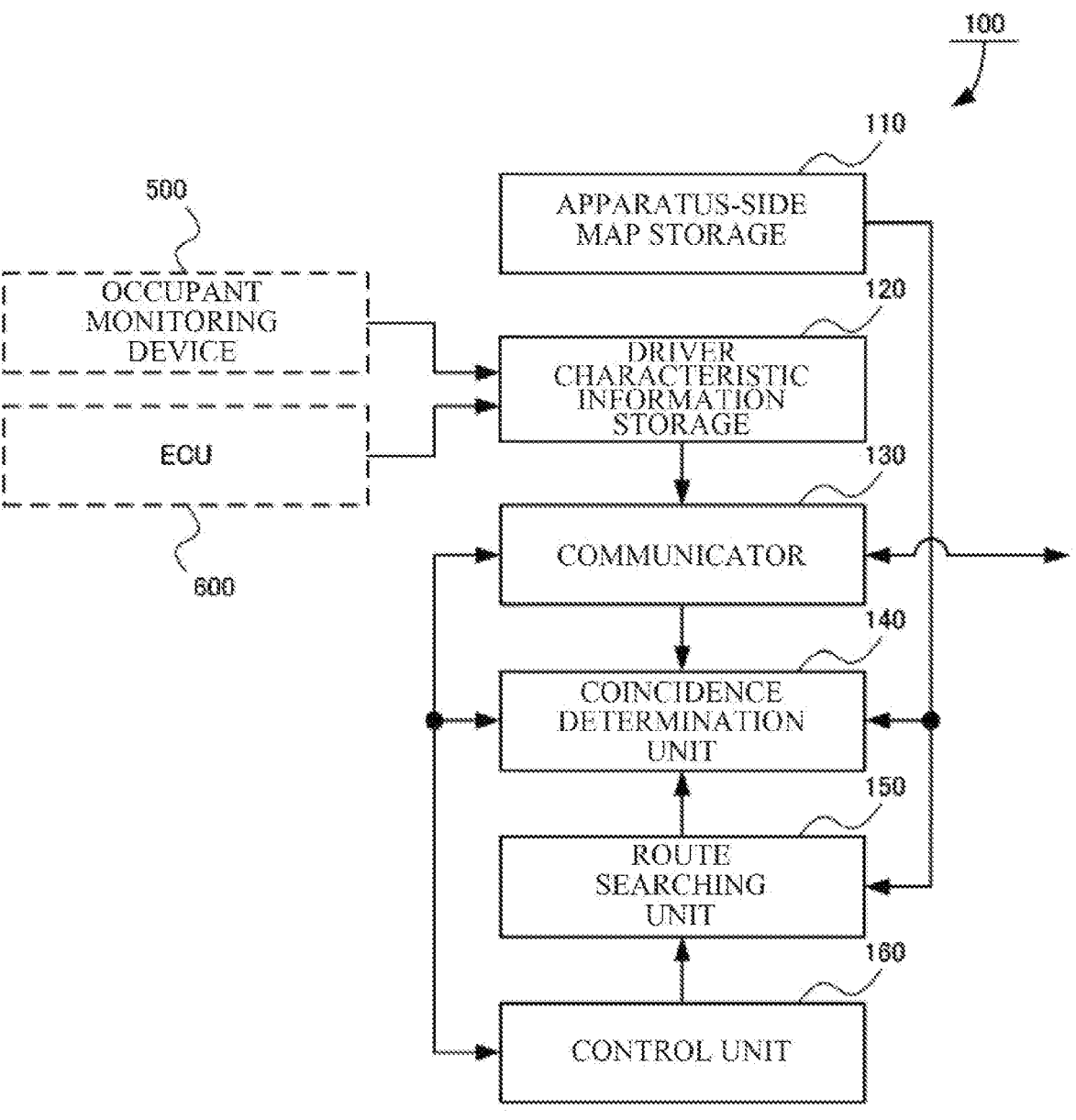
FIG. 2 is a diagram illustrating a configuration of a vehicle navigation apparatus according to one example embodiment of the disclosure.

As illustrated in FIG. 2, the vehicle navigation apparatus 100 according to the example embodiment may include an apparatus-side map storage 110, a driver characteristic information storage 120, a communicator 130, a coincidence determination unit 140, a route searching unit 150, and a control unit 160.

The apparatus-side map storage 110 holds map information including at least route information. This map information may also be referred to as apparatus-side map information.

Even if the vehicle navigation apparatus 100 is, for example, a communicable apparatus, and the map information in the apparatus-side map storage 110 is updated on a regular basis, a frequency of the update may be lower than a frequency of update of map information in the server 300 to be described later.

The driver characteristic information storage 120 holds driving operation characteristic information of the driver.

Figures 3, 4:
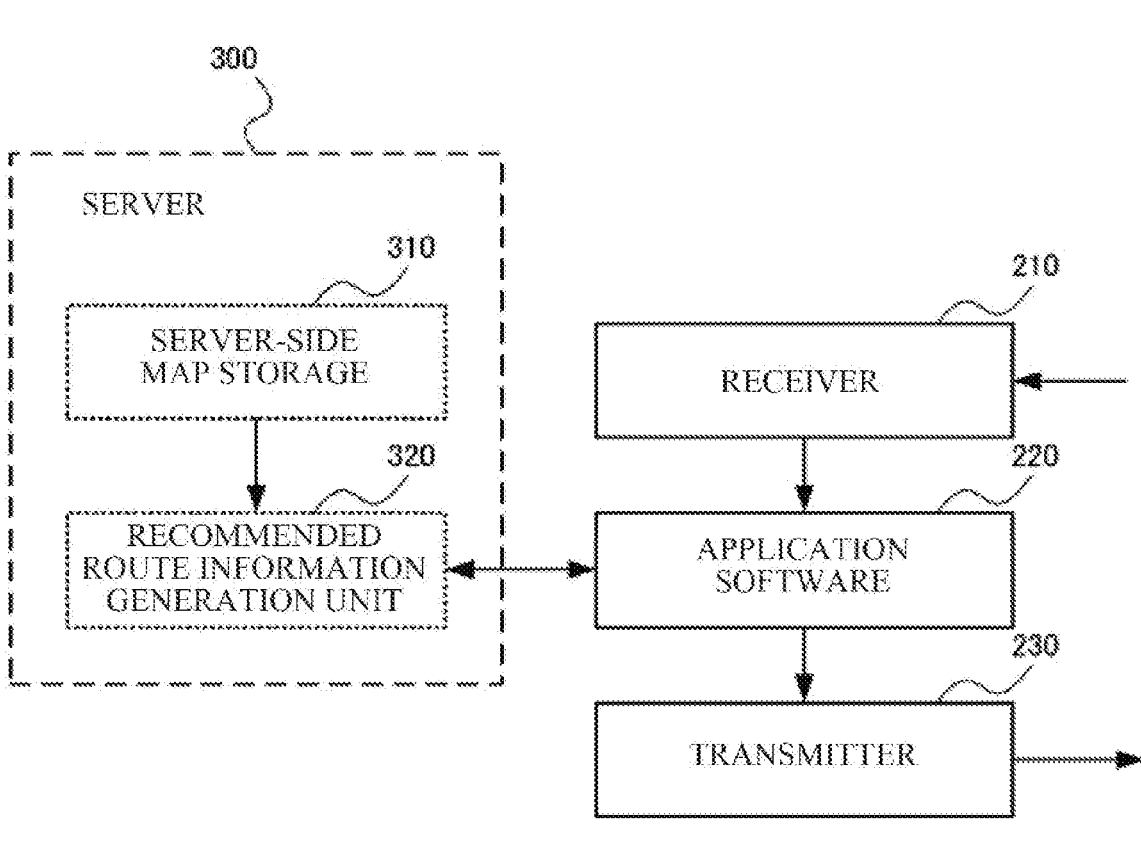
FIG. 3 is a diagram illustrating an example of driving operation characteristic information according to one example embodiment of the disclosure.
FIG. 4 is a diagram illustrating a configuration of a mobile terminal according to one example embodiment of the disclosure.

Examples of the driving operation characteristic information of the driver may include, as illustrated in FIG. 3, personal information including a sex, an age, and a driving behavior, and driving operation information including an accelerator operation, a brake operation, and a steering operation.

Note that the personal information described above may be acquired from, for example, an occupant monitoring device 500 provided in a vehicle compartment, and the driving operation information may be acquired from, for example, an electronic control unit (ECU).

The driver characteristic information storage 120 may be provided, in the vehicle compartment, in a charger that charges the mobile terminal 200. The mobile terminal 200 may use a short-range wireless communicator mounted on the charger to read the driving operation characteristic information of the driver from the driver characteristic information storage 120 by short-range wireless communication, without using the network 400.

With the configuration described above, the mobile terminal 200 is able to acquire the driving operation characteristic information of the driver, without using the communicator 130 to be described later.

The communicator 130 may transmit the driving operation characteristic information of the driver to the mobile terminal 200 via the network 400, and receive, from the mobile terminal 200 via the network 400, recommended route information retrieved based on the driving operation characteristic information of the driver.

When transmitting the driving operation characteristic information of the driver to the mobile terminal 200, the communicator 130 may transmit the driving operation characteristic information of the driver read from the driver characteristic information storage 120. When the communicator 130 receives the recommended route information retrieved based on the driving operation characteristic information of the driver from the mobile terminal 200, the communicator 130 may supply the received recommended route information to the coincidence determination unit 140 to be described later.

The coincidence determination unit 140 determines a coincidence between the recommended route information retrieved based on the driving operation characteristic information of the driver and route information based on the apparatus-side map information.

A result of determination by the coincidence determination unit 140 may be outputted to the control unit 160 to be described later.

Note that the result of determination by the coincidence determination unit 140 may include the coincidence, and information on a section in which the recommended route information retrieved based on the driving operation characteristic information of the driver and the route information based on the apparatus-side map information do not coincide with each other.

The route searching unit 150 executes searching for route information, based on the apparatus-side map information.

The retrieved route information may be outputted to the coincidence determination unit 140.

The control unit 160 may control overall operation of the vehicle navigation apparatus 100, in accordance with a control program stored in, for example an unillustrated read only memory (ROM).

In the example embodiment, for example, when the coincidence determination unit 140 determines that the coincidence is less than a predetermined coincidence, the control unit 160 may supply, to the route searching unit 150, the information on the section in which the recommended route information retrieved based on the driving operation characteristic information of the driver and the route information based on the apparatus-side map information do not coincide with each other, included in the result of determination by the coincidence determination unit 140, and control the route searching unit 150 to execute re-searching for route information.

The "predetermined coincidence" may be a predetermined value, or may be able to be set to any value by the driver. The "predetermined value" may be determined in consideration of a typical discrepancy between an apparatus-side map and a server-side map. When the value set by the driver is higher than such a "predetermined value", the driver may be prompted to perform re-setting by, for example, a message.

Figure 5:
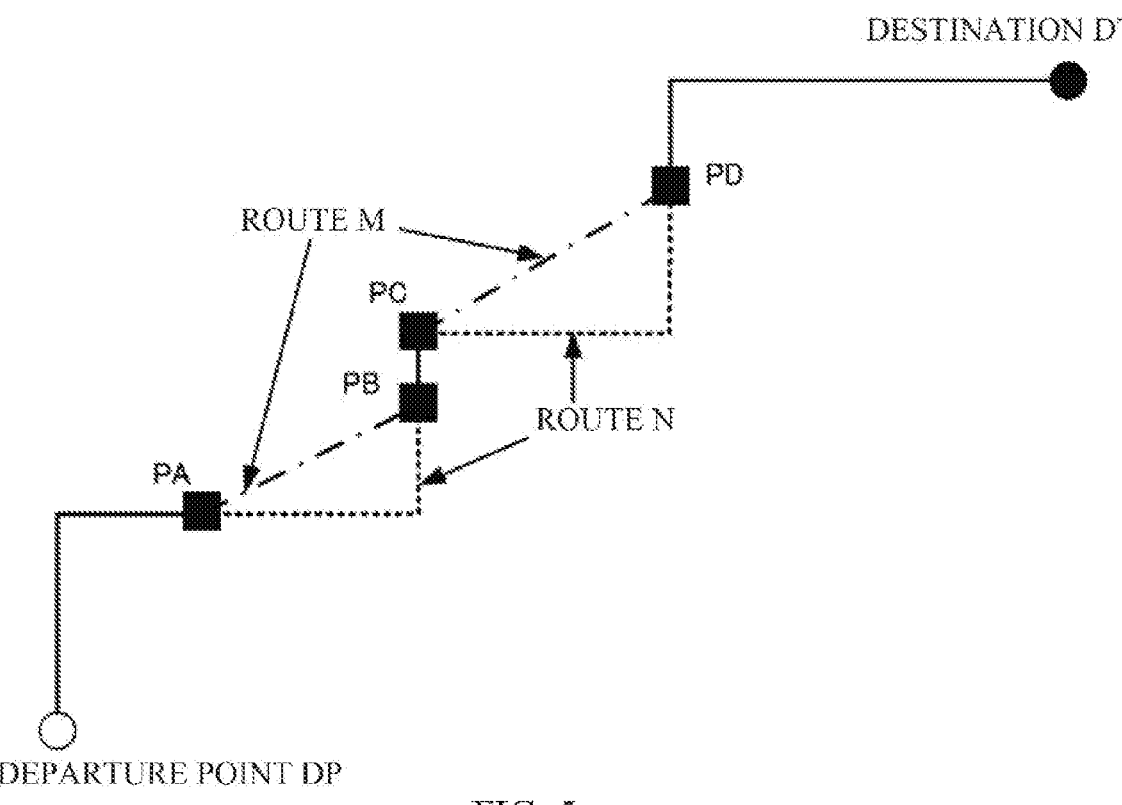
FIG. 5 is a diagram illustrating an example of a route retrieved by the vehicle navigation apparatus and a route retrieved by the mobile terminal according to one example embodiment of the disclosure.

Note that FIG. 5 illustrates route information generated by the vehicle navigation apparatus 100 and recommended route information generated by the server 300. In the drawing, a solid line represents a route where the route information generated by the vehicle navigation apparatus 100 and the recommended route information generated by the server 300 coincide with each other, a dotted line represents a route N that is a route unique to the vehicle navigation apparatus 100, and a chain line represents a route M that is a recommended route unique to the server 300.

In the example of FIG. 5, when the coincidence determination unit 140 determines that the coincidence is less than the predetermined coincidence, the control unit 160 may transmit, to the route searching unit 150, information on a "section from PA to PB" and a "section from PC to PD", as the information on the section in which the recommended route information retrieved based on the driving operation characteristic information of the driver and the route information based on the apparatus-side map information do not coincide with each other, included in the result of determination by the coincidence determination unit 140, and control the route searching unit 150 to execute re-searching for route information.

Figure 6:
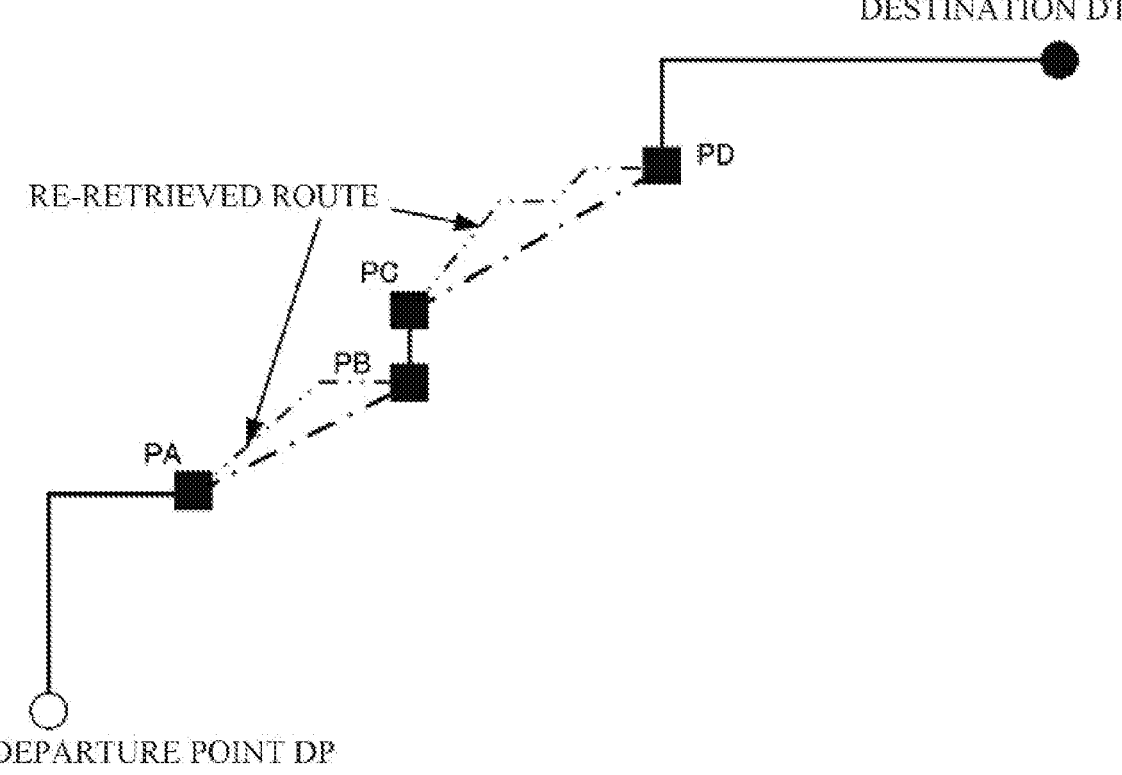
FIG. 6 is a diagram illustrating an example of a route re-retrieved instead of the route retrieved by the vehicle navigation apparatus according to one example embodiment of the disclosure.

FIG. 6 illustrates a route after a re-searching process in the route searching unit 150. In the drawing, a chain double-dashed line represents a case where a new route is re-retrieved instead of the route unique to the vehicle navigation apparatus 100 in FIG. 5.

[Configuration of Mobile Terminal 200]

As illustrated in FIG. 4, the mobile terminal 200 according to the example embodiment may include a receiver 210, application software 220, and a transmitter 230.

The receiver 210 may receive driving operation characteristic information of the driver from the vehicle navigation apparatus 100. The driving operation characteristic information of the driver received by the receiver 210 may be supplied to the application software 220 to be described later.

The application software 220 may be software to be used for a specific operation or purpose. The application software 220 in the example embodiment may be software that controls generation of recommended route information based on the driving operation characteristic information of the driver by the server 300, based on the driving operation characteristic information of the driver received by the receiver 210 and the map information stored in the server 300.

The transmitter 230 may transmit the recommended route information generated by the server 300 and obtained via the application software 220 to the vehicle navigation apparatus 100.

[Configuration of Server 300]

As illustrated in FIG. 4, the server 300 according to the example embodiment may include a server-side map storage 310 and a recommended route information generation unit 320.

The server-side map storage 310 may hold the server-side map information updated at a higher frequency than the map information stored in the apparatus-side map storage 110 of the vehicle navigation apparatus 100.

The recommended route information generation unit 320 may generate recommended route information using the server-side map information, based on information including driving operation characteristic information of the driver from the vehicle navigation apparatus 100 and obtained via the application software 220 of the mobile terminal 200. Note that the generated recommended route information may be supplied to the application software 220 of the mobile terminal 200.

[Processing by Vehicle Navigation System 1]

Processing by the vehicle navigation system 1 according to the example embodiment is described with reference to FIG. 7.

Figure 7:
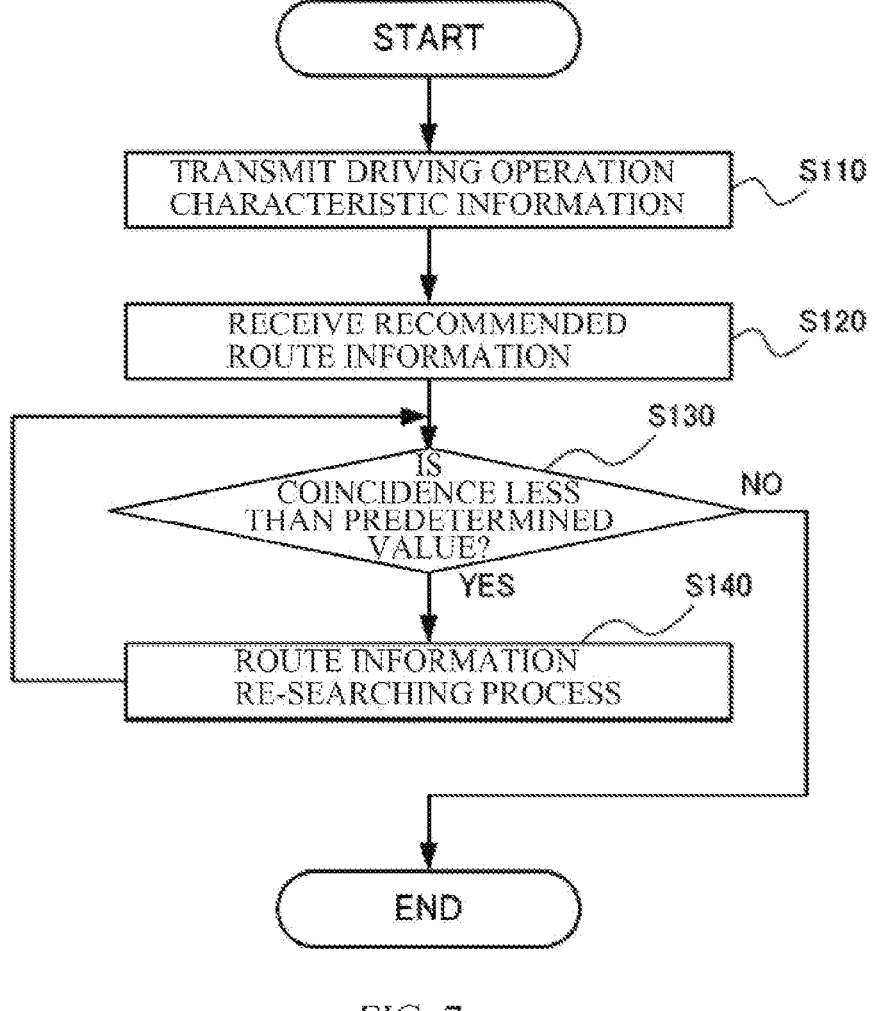
FIG. 7 is a diagram illustrating a processing flow of the vehicle navigation system according to one example embodiment of the disclosure.

As illustrated in FIG. 7, the control unit 160 of the vehicle navigation apparatus 100 may control the communicator 130 to transmit driving operation characteristic information of the driver stored in the driver characteristic information storage 120 to the mobile terminal 200 (step S110).

The communicator 130 of the vehicle navigation apparatus 100 may receive recommended route information from the mobile terminal 200, and supply the received recommended route information to the coincidence determination unit 140, based on a control signal from the control unit 160 (step S120).

The coincidence determination unit 140 of the vehicle navigation apparatus 100 may determine whether the coincidence between the recommended route information retrieved based on the driving operation characteristic information of the driver and route information based on the apparatus-side map information is less than the predetermined coincidence (step S130).

If the coincidence determination unit 140 determines that the coincidence between the recommended route information retrieved based on the driving operation characteristic information of the driver and the route information based on the apparatus-side map information is not less than the predetermined coincidence ("NO" in step S130), the coincidence determination unit 140 may end the processing.

If the coincidence determination unit 140 determines that the coincidence between the recommended route information retrieved based on the driving operation characteristic information of the driver and the route information based on the apparatus-side map information is less than the predetermined coincidence ("YES" in step S130), the coincidence determination unit 140 may report the control unit 160 that the coincidence is less than the predetermined coincidence.

The control unit 160 may transmit, to the route searching unit 150, information on a section in which the recommended route information retrieved based on the driving operation characteristic information of the driver and the route information based on the apparatus-side map information do not coincide with each other, included in the result of determination by the coincidence determination unit 140, and control the route searching unit 150 to execute a route information re-searching process. The route searching unit 150 may execute the route information re-searching process until the coincidence included in the result of determination by the coincidence determination unit 140 becomes equal to or greater than the predetermined value, and end the processing (step S140).

[Workings and Effects]

As described above, the vehicle navigation apparatus 100 according to the example embodiment holds apparatus-side map information including at least route information, and holds driving operation characteristic information of the driver. The communicator 130 transmits the driving operation characteristic information of the driver to the mobile terminal 200, and receives, from the mobile terminal 200, recommended route information retrieved based on the driving operation characteristic information of the driver. The route searching unit 150 executes searching for route information, based on the apparatus-side map information. The coincidence determination unit 140 determines a coincidence between the recommended route information retrieved based on the driving operation characteristic information of the driver by the mobile terminal 200 and the route information based on the apparatus-side map information. The route searching unit 150 executes re-searching for route information, when the coincidence determination unit 140 determines that the coincidence is less than a predetermined coincidence.

In other words, in the vehicle navigation system 1 according to the example embodiment, processing is executed to set a route where the route information from the departure point to the destination retrieved by the route searching unit 150 has a coincidence equal to or greater than the predetermined coincidence with the recommended route information retrieved based on the driving operation characteristic information of the driver by the mobile terminal 200.

This makes it possible to present a recommended route in consideration of a driver characteristic, without giving a user too much trouble.

In addition, using the mobile terminal 200 makes it possible to perform route setting from any place within a communication available area, without being limited to inside the vehicle.

In the vehicle navigation apparatus 100 according to the example embodiment, the driving operation characteristic information may include the personal information and the driving operation information.

This makes it possible to present the recommended route based on a characteristic of the driver him/herself and a driving operation tendency of the driver.

The control unit 160 of the vehicle navigation apparatus 100 according to the example embodiment may transmit, to the route searching unit 150, information on a section in which the recommended route information retrieved based on the driving operation characteristic information of the driver and the route information based on the apparatus-side map information do not coincide with each other, included in the result of determination by the coincidence determination unit 140, and cause the route searching unit 150 to execute the route information re-searching process.

In other words, instead of simply causing the route searching unit 150 to execute the route information re-searching process, the control unit 160 may transmit the information on the section in which the recommended route information retrieved based on the driving operation characteristic information of the driver and the route information based on the apparatus-side map information do not coincide with each other to the route searching unit 150, and cause the route searching unit 150 to execute the route information re-searching process. This makes it possible to increase, by a smaller number of processes, the coincidence between the recommended route information retrieved based on the driving operation characteristic information of the driver and the recommended route information based on the apparatus-side map information.

Modification Example 1

The example embodiment describes an example in which the coincidence determination unit 140 determines the coincidence between the recommended route information retrieved based on the driving operation characteristic information of the driver by the mobile terminal 200 and the route information based on the apparatus-side map information, and the route searching unit 150 executes the re-searching for route information when the coincidence determination unit 140 determines that the coincidence is less than the predetermined coincidence. Alternatively, section information indicating a section in which the route information based on the apparatus-side map information and the recommended route information do not coincide with each other may be transmitted to the mobile terminal 200 via the communicator 130, and a process of re-searching for route information based on the section information may be executed by the mobile terminal 200.

Also in this case, it is possible to present a recommended route in consideration of a driver characteristic, without giving a user too much trouble.

In addition, using the mobile terminal 200 makes it possible to perform route setting from any place within a communication available area, without being limited to inside the vehicle.

Second Example Embodiment

A vehicle navigation system 1A according to a second example embodiment is described with reference to FIGS. 8 and 9.

[Configuration of Vehicle Navigation Apparatus 100A]

Figure 8:
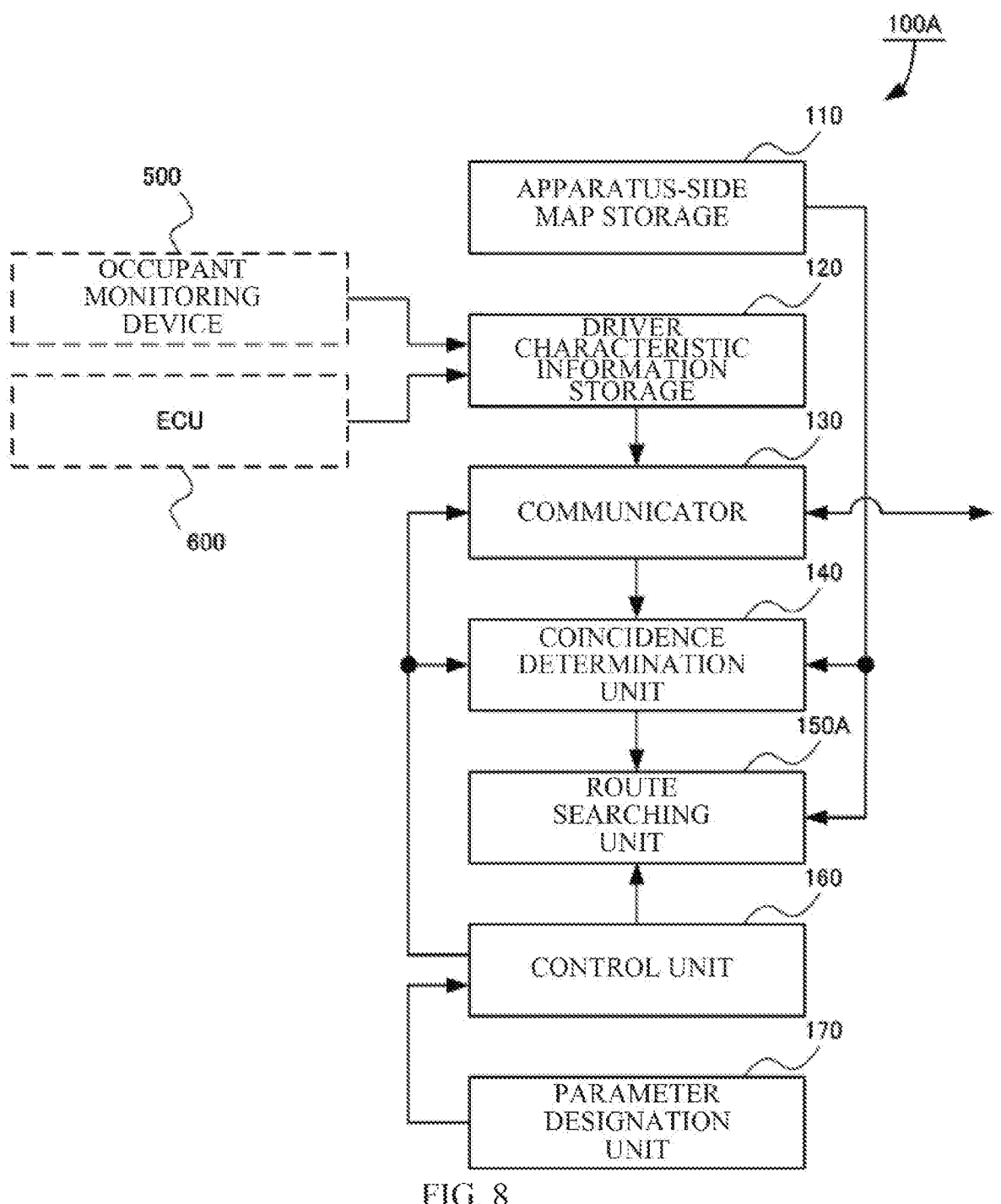
FIG. 8 is a diagram illustrating a configuration of a vehicle navigation apparatus according to one example embodiment of the disclosure.

As illustrated in FIG. 8, a vehicle navigation apparatus 100A according to the example embodiment may include the apparatus-side map storage 110, the driver characteristic information storage 120, the communicator 130, the coincidence determination unit 140, a route searching unit 150A, the control unit 160, and a parameter designation unit 170.

Note that components having configurations similar to those of the components in the first example embodiment are denoted with the same reference numerals without redundant description.

When executing the re-searching for route information, the route searching unit 150A may execute the re-searching for route information, based on a parameter designated by the user using the parameter designation unit 170 to be described later.

The parameter designation unit 170 may accept designation of the parameter by the user.

The parameter designation unit 170 may, for example, report the parameter designated by the user to the control unit 160. The control unit 160 may output the parameter reported from the parameter designation unit 170 to the route searching unit 150A and cause the route searching unit 150A to execute the route information re-searching process.

The parameter may be an index indicating what is to be prioritized in executing the re-searching in the route information re-searching process. Examples of the parameter may include necessary time and waypoint information.

[Processing by Vehicle Navigation System 1A]

Processing by the vehicle navigation system 1A according to the example embodiment is described with reference to FIG. 9.

Figure 9:
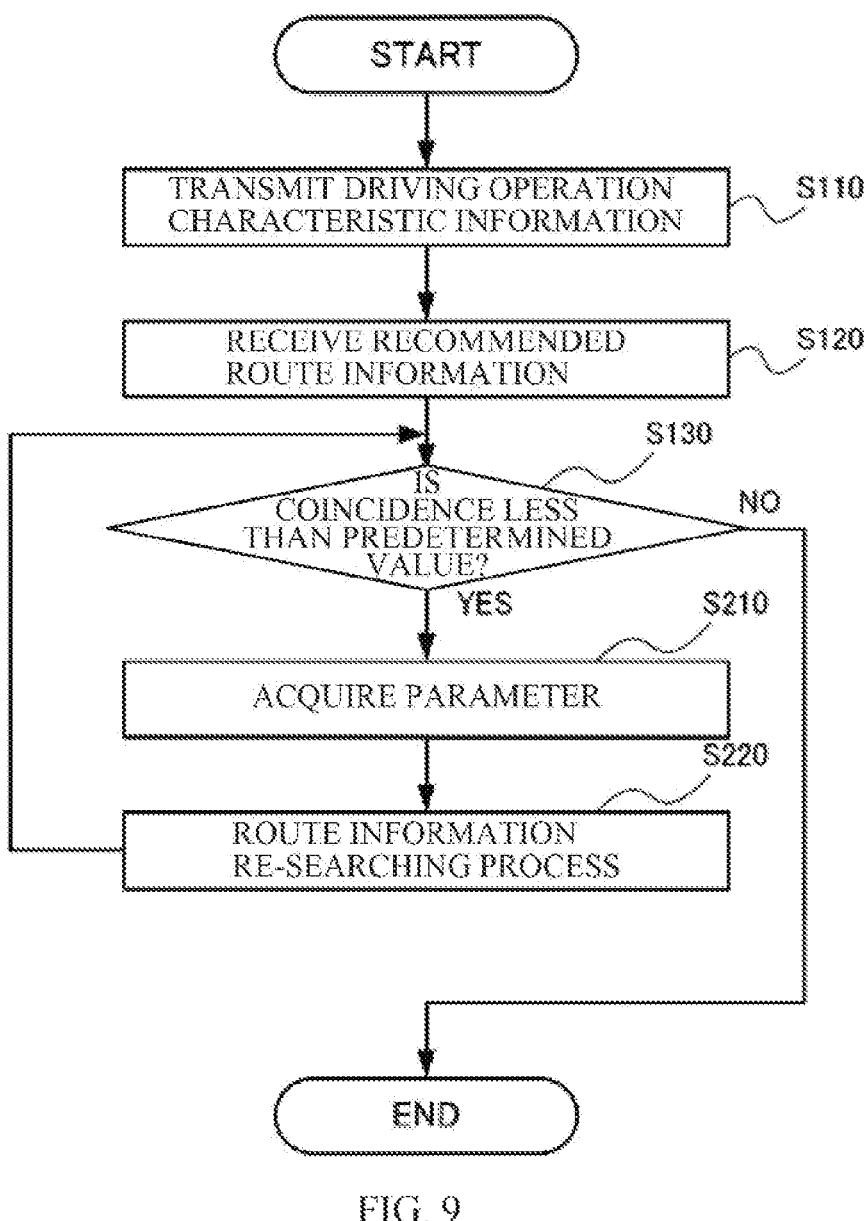
FIG. 9 is a diagram illustrating a processing flow of a vehicle navigation system according to one example embodiment of the disclosure.

As illustrated in FIG. 9, the control unit 160 of the vehicle navigation apparatus 100A may control the communicator 130 to transmit driving operation characteristic information of the driver stored in the driver characteristic information storage 120 to the mobile terminal 200 (step S110).

The communicator 130 of the vehicle navigation apparatus 100A may receive recommended route information from the mobile terminal 200, and supply the received recommended route information to the coincidence determination unit 140, based on a control signal from the control unit 160 (step S120).

The coincidence determination unit 140 of the vehicle navigation apparatus 100A may determine whether the coincidence between the recommended route information retrieved based on the driving operation characteristic information of the driver and route information based on the apparatus-side map information is less than the predetermined coincidence (step S130).

If the coincidence determination unit 140 determines that the coincidence between the recommended route information retrieved based on the driving operation characteristic information of the driver and the route information based on the apparatus-side map information is not less than the predetermined coincidence ("NO" in step S130), the coincidence determination unit 140 may end the processing.

If the coincidence determination unit 140 determines that the coincidence between the recommended route information retrieved based on the driving operation characteristic information of the driver and the route information based on the apparatus-side map information is less than the predetermined coincidence ("YES" in step S130), the coincidence determination unit 140 may report the control unit 160 that the coincidence is less than the predetermined coincidence.

The control unit 160 may acquire a parameter designated by the user from the parameter designation unit 170 (step S210).

The control unit 160 may report parameter information acquired from the parameter designation unit 170 to the route searching unit 150A, and control the route searching unit 150A to execute the route information re-searching process prioritizing the parameter. The route searching unit 150A may execute the route information re-searching process until the coincidence included in the result of determination by the coincidence determination unit 140 becomes equal to or greater than the predetermined value, and end the processing (step S220).

[Workings and Effects]

As described above, when executing the re-searching for route information, the route searching unit 150A of the vehicle navigation system 1A according to the example embodiment may execute the re-searching for route information, based on the parameter designated by the user.

In other words, the apparatus-side map information may be updated at low frequency, and the server-side map information may be updated at high frequency. Accordingly, when performing the route information re-searching process in the vehicle navigation apparatus 100A, to make the coincidence between the route information first retrieved by the route searching unit 150A and the recommended route information received from the mobile terminal 200 equal to or greater than the predetermined coincidence, the route searching unit 150A may execute a re-searching process corresponding to the parameter prioritized by the user in the re-searching.

This makes it possible to present a recommended route in consideration of a driver characteristic, without giving a user too much trouble.

In addition, using the mobile terminal 200 makes it possible to perform route setting from any place within a communication available area, without being limited to inside the vehicle.

Third Example Embodiment

A vehicle navigation system 1B according to a third example embodiment is described with reference to FIGS. 10 and 11.

[Configuration of Vehicle Navigation Apparatus 100B]

Figure 10:
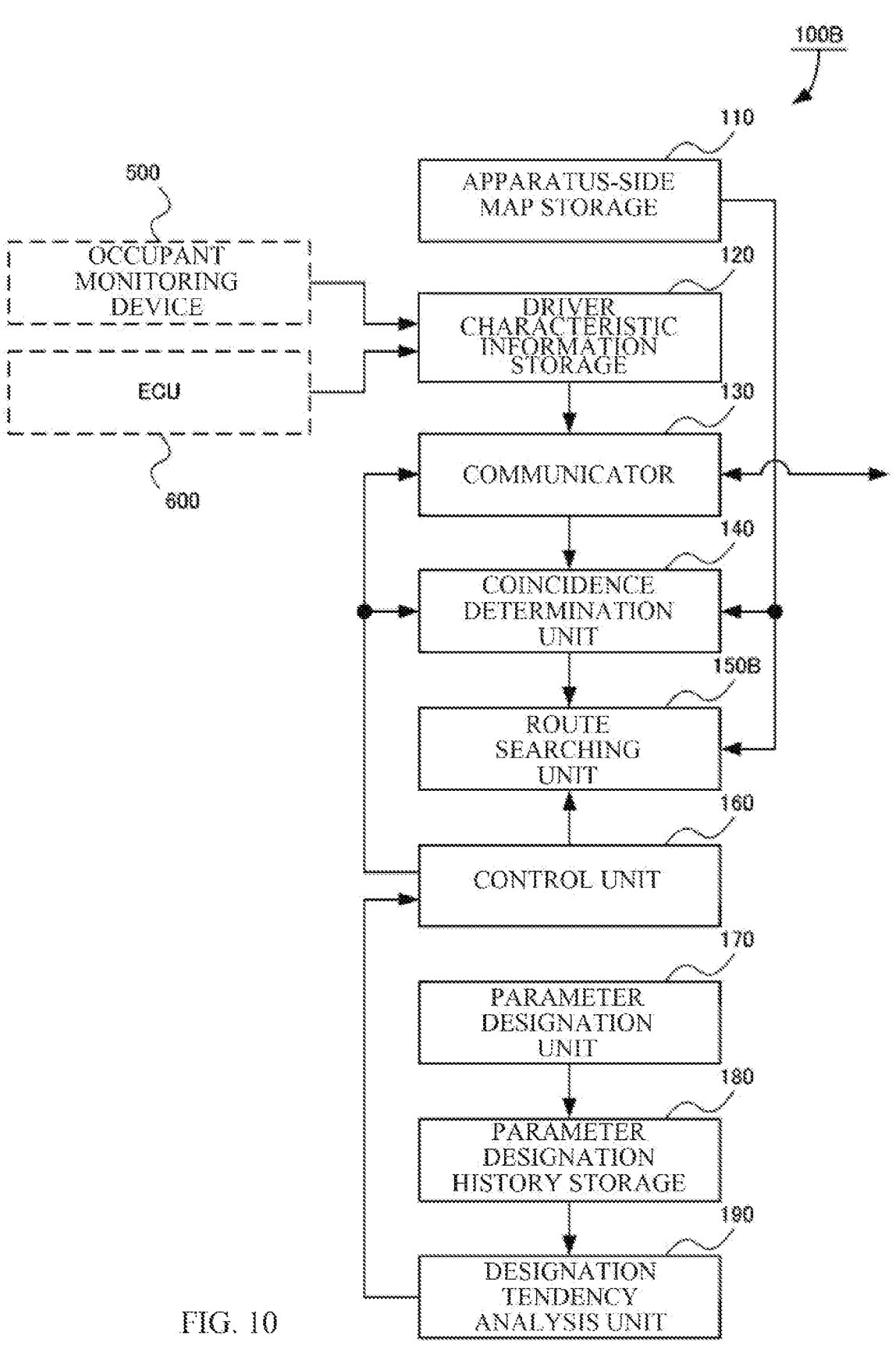
FIG. 10 is a diagram illustrating a configuration of a vehicle navigation apparatus according to one example embodiment of the disclosure.

As illustrated in FIG. 10, a vehicle navigation apparatus 100B according to the example embodiment may include the apparatus-side map storage 110, the driver characteristic information storage 120, the communicator 130, the coincidence determination unit 140, a route searching unit 150B, the control unit 160, the parameter designation unit 170, a parameter designation history storage 180, and a designation tendency analysis unit 190.

Note that components having configurations similar to those of the components in the first and second example embodiments are denoted with the same reference numerals without redundant description.

The parameter designation history storage 180 may hold a designation history of the parameter designated by the parameter designation unit 170.

The parameter designation history storage 180 may also hold, for example, auxiliary information such as a date and time when the parameter is designated, weather information, or road congestion information.

The designation tendency analysis unit 190 may analyze a designation tendency of the designated parameter.

In one example, the designation tendency analysis unit 190 may analyze what kind of parameter the user preferentially designates, and also analyze what kind of parameter the user preferentially designates in what kind of external state of the vehicle or physical state of the driver.

An analysis result obtained by the designation tendency analysis unit 190 may be reported to the control unit 160. The control unit 160 may output the analysis result reported from the designation tendency analysis unit 190 to the route searching unit 150B and cause the route searching unit 150B to execute the route information re-searching process.

When executing the re-searching for route information, the route searching unit 150B may execute the re-searching for route information, based on the analysis result obtained by the designation tendency analysis unit 190.

[Processing by Vehicle Navigation System 1B]

Processing by the vehicle navigation system 1B according to the example embodiment is described with reference to FIG. 11.

Figure 11:
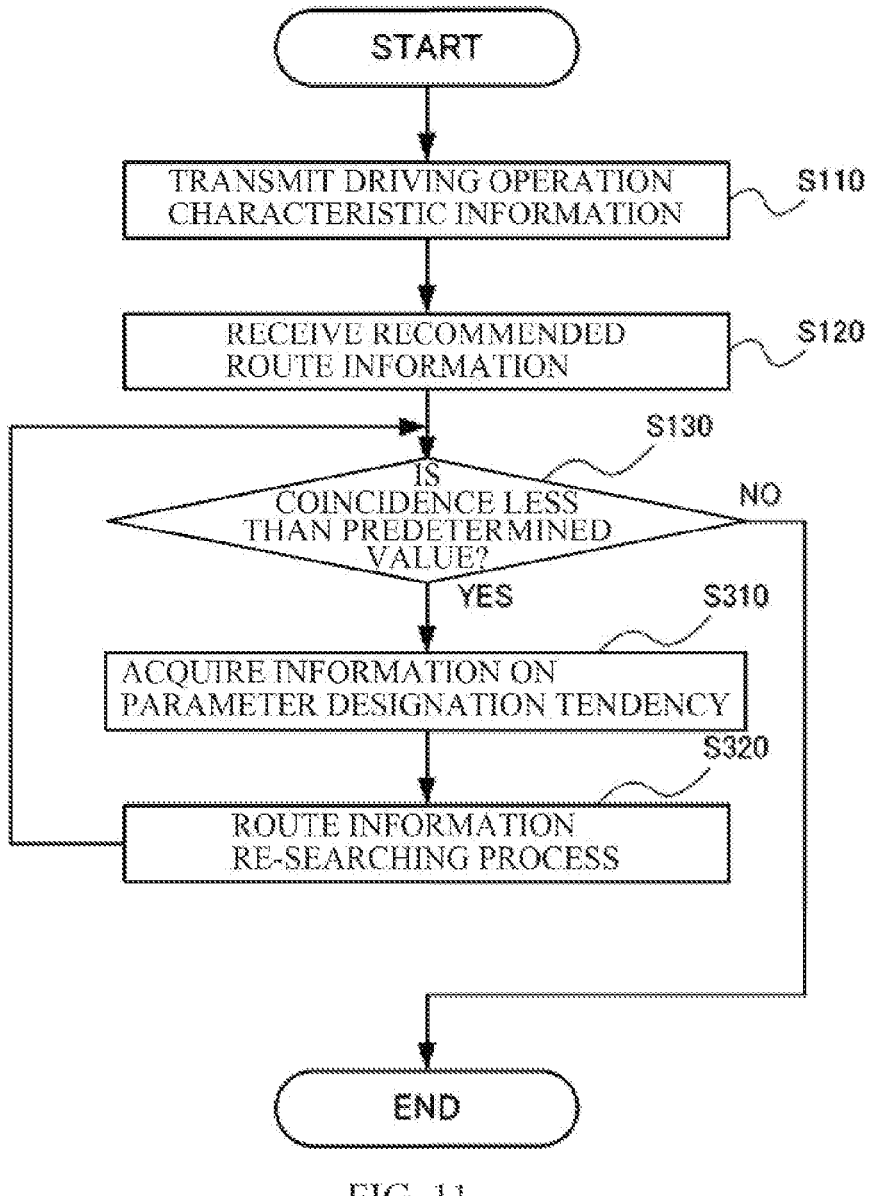
FIG. 11 is a diagram illustrating a processing flow of a vehicle navigation system according to one example embodiment of the disclosure.

As illustrated in FIG. 11, the control unit 160 of the vehicle navigation apparatus 100B may control the communicator 130 to transmit driving operation characteristic information of the driver stored in the driver characteristic information storage 120 to the mobile terminal 200 (step S110).

The communicator 130 of the vehicle navigation apparatus 100B may receive recommended route information from the mobile terminal 200, and supply the received recommended route information to the coincidence determination unit 140, based on a control signal from the control unit 160 (step S120).

The coincidence determination unit 140 of the vehicle navigation apparatus 100B may determine whether the coincidence between the recommended route information retrieved based on the driving operation characteristic information of the driver and route information based on the apparatus-side map information is less than the predetermined coincidence (step S130).

If the coincidence determination unit 140 determines that the coincidence between the recommended route information retrieved based on the driving operation characteristic information of the driver and the route information based on the apparatus-side map information is not less than the predetermined coincidence ("NO" in step S130), the coincidence determination unit 140 may end the processing.

If the coincidence determination unit 140 determines that the coincidence between the recommended route information retrieved based on the driving operation characteristic information of the driver and the route information based on the apparatus-side map information is less than the predetermined coincidence ("YES" in step S130), the coincidence determination unit 140 may report the control unit 160 that the coincidence is less than the predetermined coincidence.

The control unit 160 may acquire a designation tendency analysis result related to a parameter designated by the user from the designation tendency analysis unit 190 (step S310).

The control unit 160 may report the designation tendency analysis result acquired from the designation tendency analysis unit 190 to the route searching unit 150B, and control the route searching unit 150B to execute the route information re-searching process based on the designation tendency analysis result. The route searching unit 150B may execute the route information re-searching process until the coincidence included in the result of determination by the coincidence determination unit 140 becomes equal to or greater than the predetermined value, and end the processing (step S320).

[Workings and Effects]

As described above, the vehicle navigation system 1B according to the example embodiment may include the parameter designation unit 170, the parameter designation history storage 180, and the designation tendency analysis unit 190. The parameter designation unit 170 may accept designation of a parameter by the user when the route searching unit 150B executes the re-searching for route information. The parameter designation history storage 180 may hold a designation history of the parameter designated by the parameter designation unit 170. The designation tendency analysis unit 190 may perform an analysis of a designation tendency of the designated parameter. When executing the re-searching for route information, the route searching unit 150B may execute the re-searching for route information, based on a result of the analysis by the designation tendency analysis unit 190.

In other words, based on the current situation, the vehicle navigation apparatus 100B may analyze the tendency of the past parameter designation by the user, and cause the route searching unit 150B to execute the route information re-searching process, based on the designation tendency analysis result.

This makes it possible to present a recommended route in consideration of a driver characteristic, without giving a user too much trouble.

In addition, using the mobile terminal 200 makes it possible to perform route setting from any place within a communication available area, without being limited to inside the vehicle.

In some embodiments, it is possible to implement the vehicle navigation system 1, 1A, or 1B of the example embodiment of the disclosure by recording the process to be executed by the vehicle navigation apparatus 100, 100A, or 100B, the mobile terminal 200, or the server 300 on a non-transitory recording medium readable by a computer system, and causing the computer system to load the program recorded on the non-transitory recording medium onto the vehicle navigation apparatus 100, 100A, or 100B, the mobile terminal 200, or the server 300 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Each of the coincidence determination unit 140, the route searching units 150, 150A, and 150B, and the recommended route information generation unit 320 illustrated in FIGS. 2, 4, 8, and 10 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the coincidence determination unit 140, the route searching units 150, 150A, and 150B, and the recommended route information generation unit 320. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the coincidence determination unit 140, the route searching units 150, 150A, and 150B, and the recommended route information generation unit 320 illustrated in FIGS. 2, 4, 8, and 10.

The invention claimed is:

1. A vehicle navigation apparatus to be applied to a vehicle, the vehicle navigation apparatus comprising:

an apparatus-side map storage configured to store apparatus-side map information including route information;

a driver characteristic information storage configured to store information indicative of actual vehicle-operation behavior of a driver of the vehicle;

a communicator configured to transmit the information indicative of actual vehicle-operation behavior of the driver to a mobile terminal, and receive, from the mobile terminal, recommended route information retrieved based on the actual vehicle-operation behavior of the driver;

a route searching unit configured to execute searching for route information, based on the apparatus-side map information; and a coincidence determination unit configured to determine a degree of coincidence between the recommended route information retrieved based on the information indicative of actual vehicle-operation behavior of the driver and the route information based on the apparatus-side map information, wherein the route searching unit is configured to, when the coincidence determination unit determines that the degree of coincidence is less than a predetermined threshold, execute re-searching for route information.

2. The vehicle navigation apparatus according to claim 1, wherein the information indicative of actual vehicle-operation behavior information comprises personal information and driving operation information.

3. A vehicle navigation system comprising:
the vehicle navigation apparatus according to claim 2;
the mobile terminal; and
a server, wherein
the mobile terminal comprises
  a receiver configured to receive the information indicative of actual vehicle-operation behavior of the driver from the vehicle navigation apparatus, and
  a transmitter configured to transmit the recommended route information generated by the server to the vehicle navigation apparatus, and
the server comprises
  a server-side map storage configured to store server-side map information comprising route information, and
  a recommended route information generation unit configured to generate the recommended route information using the server-side map information, based on information comprising the information indicative of actual vehicle-operation behavior of the driver from the vehicle navigation apparatus.

4. The vehicle navigation apparatus according to claim 1, wherein, when the re-searching for route information is to be executed, the communicator is configured to transmit, to the mobile terminal, section information indicating a section in which the route information based on the apparatus-side map information and the recommended route information do not coincide with each other, and receive recommended route information retrieved based on the section information by the mobile terminal.

5. A vehicle navigation system comprising:
the vehicle navigation apparatus according to claim 4;
the mobile terminal; and
a server, wherein
the mobile terminal comprises
  a receiver configured to receive the information indicative of actual vehicle-operation behavior of the driver from the vehicle navigation apparatus, and
  a transmitter configured to transmit the recommended route information generated by the server to the vehicle navigation apparatus, and
the server comprises
  a server-side map storage configured to store server-side map information comprising route information, and
  a recommended route information generation unit configured to generate the recommended route information using the server-side map information, based on information comprising the information indicative of actual vehicle-operation behavior of the driver from the vehicle navigation apparatus.

6. The vehicle navigation apparatus according to claim 1, wherein, when executing the re-searching for route information, the route searching unit is configured to execute the re-searching for route information, based on a parameter designated by a user of the vehicle.

7. A vehicle navigation system comprising:
the vehicle navigation apparatus according to claim 6;
the mobile terminal; and
a server, wherein
the mobile terminal comprises a receiver configured to receive the information indicative of actual vehicle-operation behavior of the driver from the vehicle navigation apparatus, and
  a transmitter configured to transmit the recommended route information generated by the server to the vehicle navigation apparatus, and
the server comprises
  a server-side map storage configured to store server-side map information comprising route information, and
  a recommended route information generation unit configured to generate the recommended route information using the server-side map information, based on information comprising the information indicative of actual vehicle-operation behavior of the driver from the vehicle navigation apparatus.

8. The vehicle navigation apparatus according to claim 1, further comprising:
a parameter designation unit configured to accept designation of a parameter by a user of the vehicle when the route searching unit executes the re-searching for route information;
a parameter designation history storage configured to store a designation history of the parameter designated by the parameter designation unit; and
a designation tendency analysis unit configured to perform an analysis of a designation tendency of the designated parameter, wherein,
when executing the re-searching for route information, the route searching unit is configured to execute the re-searching for route information, based on a result of the analysis by the designation tendency analysis unit.

9. A vehicle navigation system comprising:
the vehicle navigation apparatus according to claim 8;
the mobile terminal; and
a server, wherein
the mobile terminal comprises
  a receiver configured to receive the information indicative of actual vehicle-operation behavior of the driver from the vehicle navigation apparatus, and
  a transmitter configured to transmit the recommended route information generated by the server to the vehicle navigation apparatus, and
the server comprises
  a server-side map storage configured to store server-side map information comprising route information, and
  a recommended route information generation unit configured to generate the recommended route information using the server-side map information, based on information comprising the information indicative of actual vehicle-operation behavior of the driver from the vehicle navigation apparatus.

10. The vehicle navigation apparatus according to claim 1, wherein the driver characteristic information storage is provided in a charger configured to charge the mobile terminal.

11. A vehicle navigation system comprising:
the vehicle navigation apparatus according to claim 10;
the mobile terminal; and
a server, wherein
the mobile terminal comprises
  a receiver configured to receive the information indicative of actual vehicle-operation behavior of the driver from the vehicle navigation apparatus, and a transmitter configured to transmit the recommended route information generated by the server to the vehicle navigation apparatus, and the server comprises a server-side map storage configured to store server-side map information comprising route information, and a recommended route information generation unit configured to generate the recommended route information using the server-side map information, based on information comprising the information indicative of actual vehicle-operation behavior of the driver from the vehicle navigation apparatus.

12. A vehicle navigation system comprising:

the vehicle navigation apparatus according to claim 1;

the mobile terminal; and a server, wherein the mobile terminal comprises a receiver configured to receive the information indicative of actual vehicle-operation behavior of the driver from the vehicle navigation apparatus, and a transmitter configured to transmit the recommended route information generated by the server to the vehicle navigation apparatus, and the server comprises a server-side map storage configured to store server-side map information comprising route information, and a recommended route information generation unit configured to generate the recommended route information using the server-side map information, based on information comprising the information indicative of actual vehicle-operation behavior of the driver from the vehicle navigation apparatus.

13. The vehicle navigation system according to claim 12, wherein the mobile terminal is configured to execute a process of re-searching for route information based on section information transmitted from the vehicle navigation apparatus.

14. The vehicle navigation apparatus according to claim 1, wherein the predetermined threshold is settable by the driver, and when the driver sets the predetermined threshold higher than a predetermined value, the vehicle navigation apparatus outputs a message prompting the driver to reset the predetermined threshold.

15. The vehicle navigation apparatus according to claim 1, further comprising a controller configured to:

supply, to the route searching unit, information on a section in which the recommended route information and the route information do not coincide with each other; and control the route searching unit to execute re-searching for route information based on the section information.

16. The vehicle navigation apparatus according to claim 1, wherein the mobile terminal is external to the vehicle navigation apparatus and physically separate from the vehicle navigation apparatus.

17. A vehicle navigation apparatus to be applied to a vehicle, the vehicle navigation apparatus comprising:

an apparatus-side map storage configured to store apparatus-side map information including route information;

a driver characteristic information storage configured to store information indicative of actual vehicle-operation behavior of a driver of the vehicle;

a communicator configured to transmit the information indicative of actual vehicle-operation behavior of the driver to a mobile terminal, and receive, from the mobile terminal, recommended route information retrieved based on the actual vehicle-operation behavior of the driver; and circuitry configured to:

execute searching for route information, based on the apparatus-side map information; and determine a degree of coincidence between the recommended route information retrieved based on the information indicative of actual vehicle-operation behavior of the driver and the route information based on the apparatus-side map information, wherein the circuitry is configured to, when the circuitry determines that the degree of coincidence is less than a predetermined threshold, execute re-searching for route information.

18. The vehicle navigation apparatus according to claim 17, wherein the mobile terminal is external to the vehicle navigation apparatus and physically separate from the vehicle navigation apparatus.

19. A vehicle navigation apparatus to be applied to a vehicle, the vehicle navigation apparatus comprising:

an apparatus-side map storage configured to store apparatus-side map information including route information;

a driver characteristic information storage configured to store information indicative of actual vehicle-operation behavior of a driver of the vehicle;

a communicator configured to transmit the information indicative of actual vehicle-operation behavior of the driver to a mobile terminal, and receive, from the mobile terminal, recommended route information retrieved based on the actual vehicle-operation behavior of the driver;

a route searching unit configured to execute searching for route information, based on the apparatus-side map information; and a coincidence determination unit configured to determine a degree of coincidence between the recommended route information retrieved based on the information indicative of actual vehicle-operation behavior of the driver and the route information based on the apparatus-side map information, wherein the route searching unit is configured to, when the coincidence determination unit determines that the degree of coincidence is less than a predetermined threshold, execute re-searching for route information.

20. The vehicle navigation apparatus according to claim 19, wherein the mobile terminal is external to the vehicle navigation apparatus and physically separate from the vehicle navigation apparatus.

* * * * *